United States Patent [19]
Schneider

[11] 3,936,927
[45] Feb. 10, 1976

[54] AUGER ATTACHMENT METHOD FOR INSULATION

[75] Inventor: William C. Schneider, Houston, Tex.

[73] Assignee: The United States of America as represented by the United States National Aeronautics and Space Administration Office of General Counsel-Code GP, Washington, D.C.

[22] Filed: July 24, 1974

[21] Appl. No.: 491,417

[52] U.S. Cl. .............. 29/526; 29/432; 29/433; 52/705; 52/758 F; 244/117 A; 244/163
[51] Int. Cl.² .................................. B23P 19/00
[58] Field of Search ............ 29/432, 428, 526, 433; 52/582, 705 X, 758 F X; 244/117 A X, 163 X; 102/105

[56] References Cited
UNITED STATES PATENTS 3,210,233  10/1965  Kummer et al. ............ 244/117 A X
3,612,447  10/1971  Newsom ..................... 244/117 A

FOREIGN PATENTS OR APPLICATIONS 646,210  11/1950  United Kingdom ............... 29/433

Primary Examiner—Charlie T. Moon
Attorney, Agent, or Firm—Carl O. McClenny; John R. Manning; Marvin F. Matthews

[57] ABSTRACT

An auger device is used to attach rigidized surface insulation to a spacecraft. The auger is preferably screwed into an insulation tile which has been pre-drilled. The augertile combination is then fastened to the spacecraft using an attachment screw which penetrates the spacecraft skin and which is secured by a blind end fastener. In an alternate method, the auger is incorporated in the insulation tile when the latter is fabricated.

1 Claim, 4 Drawing Figures

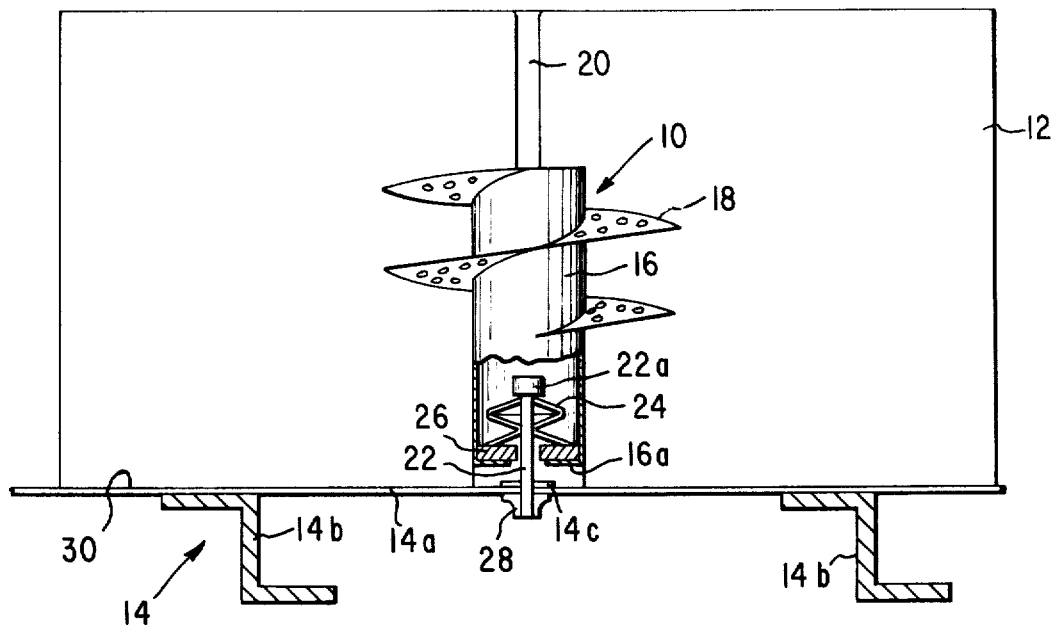
FIG. 1
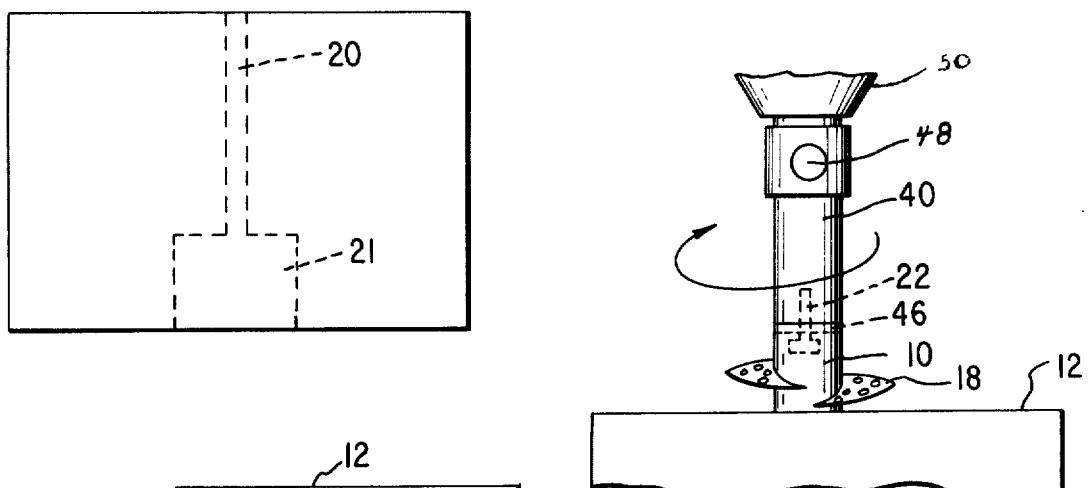
FIG. 2
FIG. 3
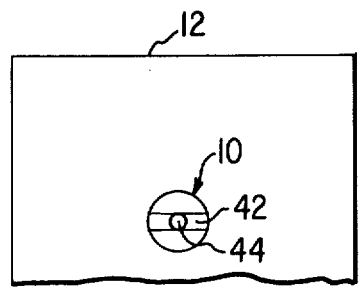
FIG. 4

AUGER ATTACHMENT METHOD FOR INSULATION

FIELD OF THE INVENTION

The present invention relates to an improved method for attaching rigidized surface insulation to a spacecraft.

BACKGROUND OF THE INVENTION

Attaching or fastening rigidized surface insulation to a spacecraft such as an orbiter shuttle vehicle presents a number of problems. The technique presently in use provides for bonding of the insulation to a rigid strain arrestor plate which, in turn, is bonded to a strain isolator pad, the pad being bonded directly to the skin structure of the spacecraft. This technique suffers serious disadvantages. For example, the strain induced in adjacent components must be compatible in order for the insulation to remain in place. However, with the technique outlined above, large compatability stresses are induced in the various components due to thermally and mechanically induced strains. Further, the orbiter skin cannot be allowed to buckle since transverse stresses would be induced in the rigidized surface insulation tending to cause separation, and this is a problem with the technique in question. In addition, this technique requires that the external fastener heads be flush with the outer surface of the skin. The foregoing problems dictate a relatively heavy design thereby adding to the overall weight. Yet another problem concerns the use of bonding as a means of attaching the insulation since such bonding degrades the overall system reliability.

SUMMARY OF THE INVENTION

In accordance with the invention, an auger device or mechanism is utilized to fasten rigidized surface insulation to a spacecraft. The auger can be screwed into an insulation tile or included therein when the tile is fabricated, and the combination of the auger and tile is fastened to the skin of the spacecraft through suitable means such as an attachment screw which penetrates the skin, and an associated fastener. The rigidized surface insulation is weak in tension and shear, and thus applying the loads required to keep the insulation in place on the spacecraft (effectively at a point) presents a problem. An auger, because of the large shear and bearing area employed thereby, permits the application of relatively large loads to the insulation.

Among a number of major advantages of the attachment method of the invention over the present "baseline" method of attachment described is the reduction in weight of the attachment device as compared with the attachment device currently used. Further, since the auger arrangement provides for attachment of the structure to the orbiter skin at only one point, the orbiter structure is free to deform, due, e.g., to thermally or mechanically induced loads, without inducing compatability stresses. Further in this regard, the orbiter structure can be designed so as to permit the skin to buckle thus providing the possibility of large weight savings. In addition, the attachment method of the invention eliminates the need for flush external fastener heads as was required in the fastening technique described above, thus providing a more lightweight design. Further, elimination of the need for the series bonding of the various components as described above, eliminates the unreliability associated with such bonding. Thus, to briefly summarize, the method of the invention eliminates compatibility stresses, reduces weight, and improves reliability as compared with the attachment method presently in use.

Other features and advantages of the invention will be set forth in or apparent from the detailed description of a preferred embodiment found hereinbelow.

BRIEF DESCRIPTION OF THE DRAWINGS

FIG. 1 is a side elevational view, partly in section and partly broken away, illustrating the auger attachment method of the invention;

FIG. 2 is a side elevational view of a rigid surface insulation member which has been predrilled in accordance with initial steps in the attachment method of the invention;

FIG. 3 is a side elevational view illustrating the screwing of the auger into a rigid surface insulation member; and FIG. 4 is a plan view of a rigid surface insulation member with an auger screwed thereinto.

DESCRIPTION OF THE PREFERRED EMBODIMENTS

Referring to FIG. 1, an insulation attachment auger according to the invention is generally denoted 10. The auger 10 is used to attach a rigidized surface insulation (RSI) member or tile 12 to the body or base structure 14 of a spacecraft such as an orbiter shuttle vehicle. The auger 10 is installed from the side of the RS1 member 12 which ultimately goes next to orbiter skin, i.e., auger 10 is screwed in from the side adjacent the base structure 14. The base structure 14 includes a spacecraft skin 14a and a support arrangement therefor indicated by support elements 14b.

The auger 10 includes a hollow, substantially cylindrical stem 16 and a helical blade 18 which extends laterally outward from stem 16 as shown. Auger 10 is attached to the spacecraft base structure 14 by means of an attachment screw 22 which extends through a hole or aperture 14c in spacecraft skin 14a. Attachment screw 22 is mounted within auger stem 16 by means of an arrangement including a plurality of preloaded "Belleville" washers or springs 24 which are disposed between the head 22a of attachment screw 22 and an annular insulating washer 26 which is seated at the base of auger stem 16. A generally annular, inwardly extending flange or abutment 16a supports washer 26 and screw 22 extends through central opening in washer 26 and flange 16a as illustrated. A blind fastener 28 is used to affix or fasten attachment screw 22 to the spacecraft skin 14a.

A lightweight fibrous pad 30 is located between the insulating tile 12 and the spacecraft skin 14a.

As is illustrated in FIGS. 1 and 2, in accordance with a preferred emodiment, a tool hole 20, a portion of which is shown at the top of FIG. 1, is drilled into insulation tile 12 prior to the installation of the auger. In addition to the tool hole 20, a second hole 21 is predrilled on the opposite side of RSI tile 12 which receives the auger stem 16. The required depth for hole 21 is only enough to clear the head of attachment screw 22 and the Belleville washers 24. However, the RSI tile 12 may be predrilled to depth corresponding to the entire auger stem 16. If the RSI tile 12 is predrilled to the minimum depth, the portion of the auger stem 16 above the head 22a of attachment screw 22 and the Belleville washers will be filled with insulation material from the tile 12 since that portion of the auger stem 16 operates much in the manner of a cookie cutter.

Considering the various steps in the attachment method of the invention, as mentioned above and as can best be seen in FIG. 2, the insulating tile 12 is first predrilled at 20 to provide a clearance hole for a tool to be described hereinbelow, and at 21 to provide a clearance for the auger stem 16. The auger 10 is then screwed into the rigidized surface insulation tile 12 as illustrated in FIG. 3. Installation of auger 10 is effected through the utilization of a special tool which is indicated at 40 in FIG. 3. As shown in FIG. 4, the closed outer end of auger 10 includes a diametric slot 42 and a central hole 44 that corresponds to the hole through which attachment screw 22 extends in FIG. 1. Tool 40 includes female threading (not shown) for receiving attachment screw 22 and a diametric land, indicated at 46 in FIG. 4, which mates with slot 42, similar to the operation of a spanner wrench. When the special tool 40 and the auger 10 are properly mated, the mated assembly is placed into the chuck 50 of a device such as a drill press (not shown). The drill press is used only to hold and align the auger 10 and the turning force, indicated by the arrow in FIG. 3, is provided, for example, by an end wrench or by a "cheater" bar inserted through a diametric hole 48 drilled into tool 40. When auger 10 is properly installed in RSI tile 12, tool 40 is removed by loosening attachment screw 22. Access to attachment screw 22 is provided through tool hole 20. It is noted that auger 10 is screwed into tile 12 below the surface of the latter by 1/32 to 1/8 in. in an exemplary embodiment. This allows the auger 10 to be isolated from the spacecraft skin 14a thereby preventing relative vibration between the auger and the RSI tile. The auger-tile combination and associated pad are held in position relative to the spacecraft skin 14a and the end attachment screw 22 is secured in place by use of blind end fastener. Attachment screw 22 is tightened by means of a suitable tool such as an Allen wrench inserted through tool hole 20. At this stage the fibrous pad 30 is preloaded.

As indicated above, rather than screwing the auger 10 into tile 12, the auger 10 may be encased in the tile when the latter is fabricated. It is also noted that while the use of the blind fastener 28 is the preferred method of attaching the screw 22 to the spacecraft skin, the blind fastener can be replaced by any other suitable arrangement for attaching the screw to the skin, such as, for example, the use of a "nut plate" bonded to the skin.

Although the present invention has been described relative to exemplary embodiment thereof, it will be understood by those skilled in the art that variations and modifications can be effected in these embodiments without departing from the scope and spirit of the invention.

I claim:

1. A method of attaching a rigidized surface insulation to a spacecraft comprising the steps of:
   a. drilling a clearance hole in one side of said insulation, said clearance hole extending for only a portion of the thickness of said insulation;
   b. drilling a tool hole on the opposite side of said insulation, coaxial and in communication with said clearance hole, said tool hole being located on the side of said insulation which will be exposed to an extreme temperature environment;
   c. installing a blind-end fastener in a selected location on said spacecraft;
   d. inserting an auger attachment means in said insulation through said clearance hole in said insulation, said auger having an attachment screw integral therewith, and connected to said auger by preloaded spring means;
   e. aligning said attachment screw with said blind-end fastener; and
   f. securing said insulation in place by tightening said attachment screw by means of a tool inserted through said tool hole and communicating with said attachment screw.

* * * * *